May 6, 1924. 1,493,268

D. M. KINTNER

ROTARY ENGINE

Filed July 3, 1922 3 Sheets-Sheet 1

Inventor
Dan M. Kintner.

By Lacey & Lacey, Attorneys

May 6, 1924.
D. M. KINTNER
ROTARY ENGINE
Filed July 3, 1922
1,493,268
3 Sheets-Sheet 2
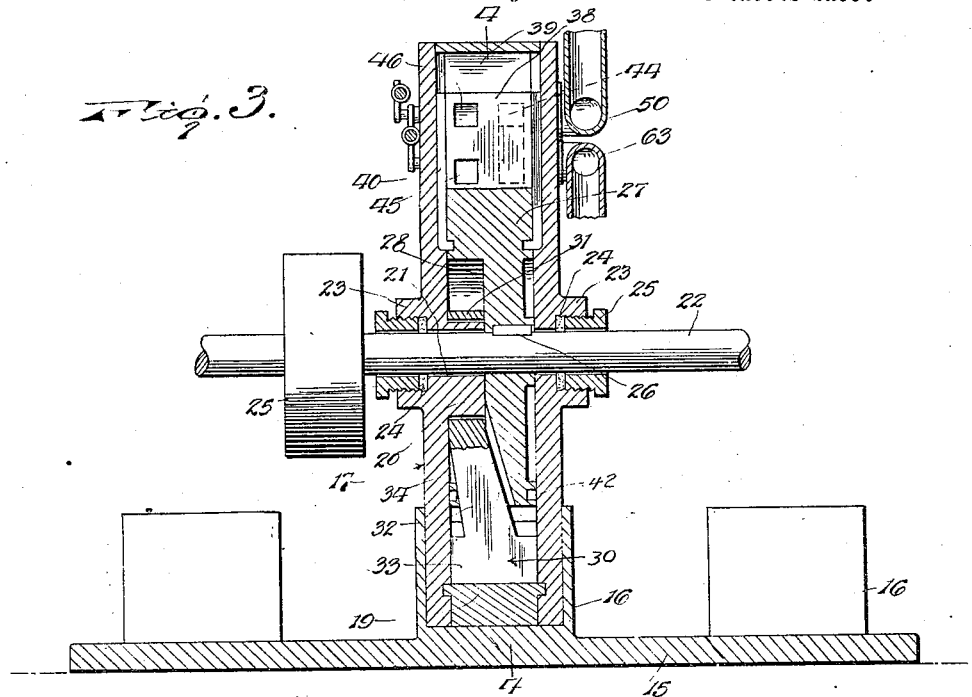
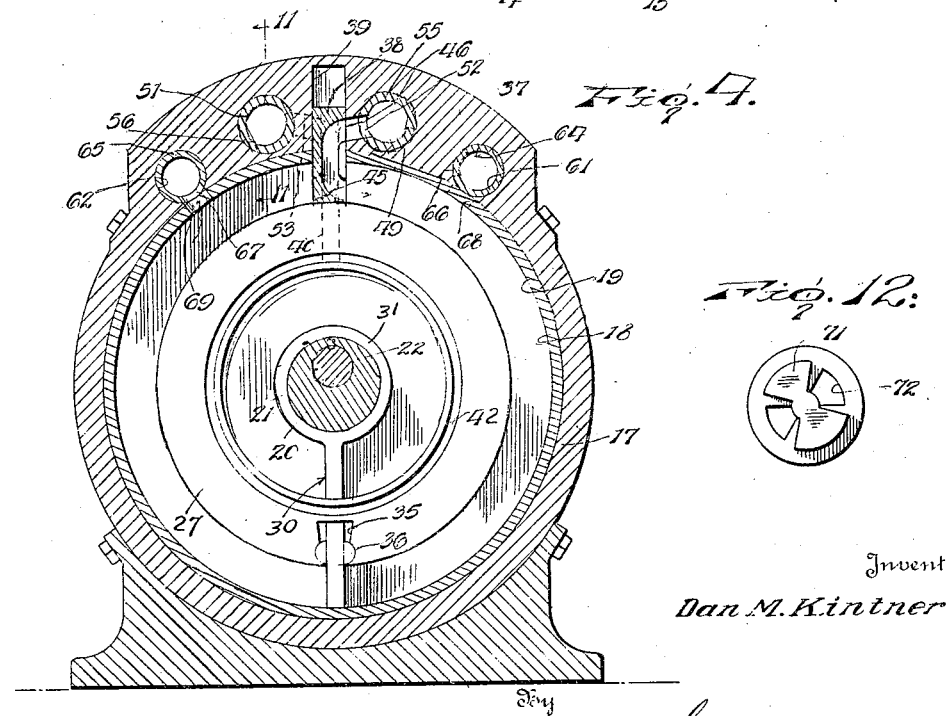
Inventor
Dan M. Kintner.

May 6, 1924. 1,493,268
D. M. KINTNER
ROTARY ENGINE
Filed July 3, 1922   3 Sheets-Sheet 3
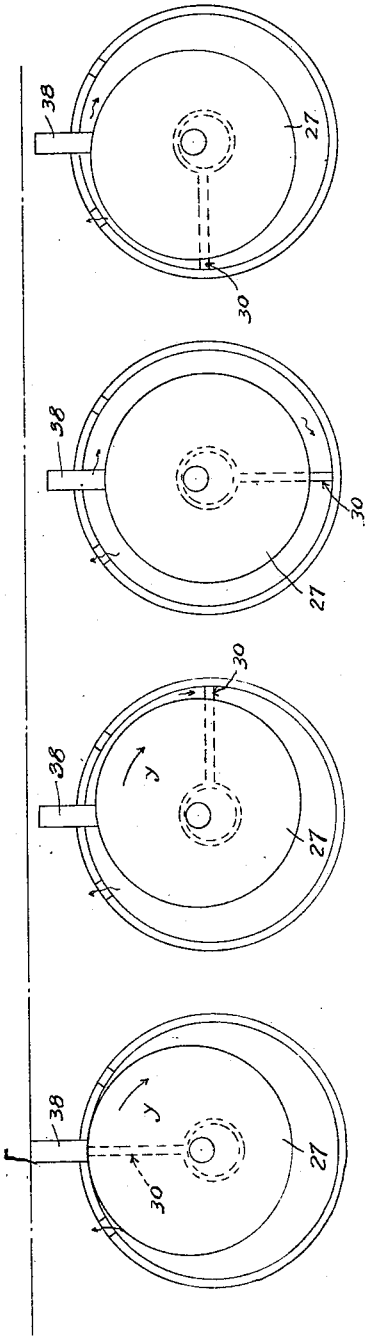
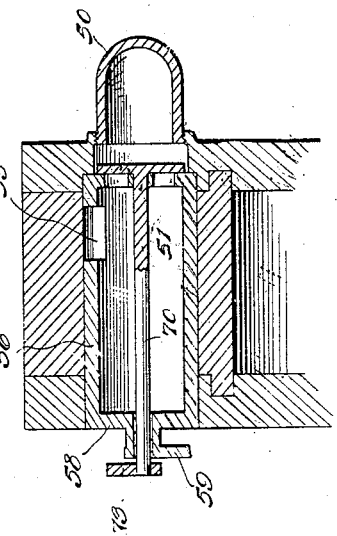
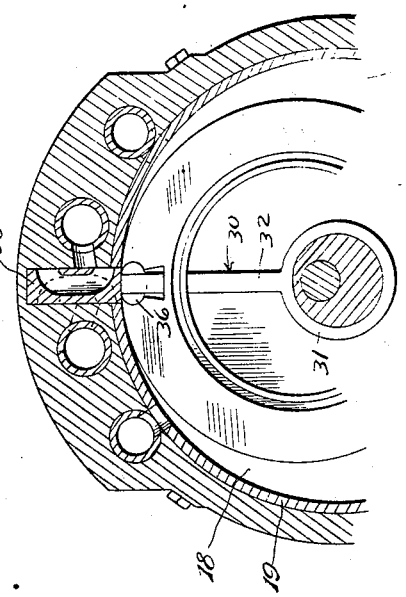
Inventor
Dan M. Kintner.
By
Lacey & Lacey, Attorney Patented May 6, 1924.

1,493,268

UNITED STATES PATENT OFFICE.

DAN M. KINTNER, OF DEFIANCE, OHIO.

ROTARY ENGINE.

Application filed July 3, 1922. Serial No. 572,454.

*To all whom it may concern:*

Be it known that I, DAN M. KINTNER, a citizen of the United States, residing at Defiance, in the county of Defiance and State of Ohio, have invented certain new and useful Improvements in Rotary Engines, of which the following is a specification.

The present invention relates to rotary engines wherein the rotor is eccentrically mounted in the cylinder or casing.

The main object of this invention is to provide an engine of this character having few and substantial parts, easy to assemble and dismount and an engine that will not readily get out of order.

Another object of the invention is to eliminate crank shafts, connecting rods, wrist pins, crossheads, cams and other similar parts that easily wear out and cause knocking in an engine.

Still another object is to arrange two or more rotors and cylinders along one driving shaft which is preferably straight and not cranked, and in this manner to overcome all dead centers, moving of weights and to diminish friction as much as possible and cylinder back pressure.

One embodiment of the invention is illustrated in the accompanying drawings as applied to a steam engine. It should, however, be understood that the invention may equally well be applied to gasoline or gas engines or any other internal combustion engine.

In the drawings—

Figure 3 is a section on the line 3—3 of Figure 1;

Figure 4 is a section on the line 4—4 of Figure 3;

Figures 6, 7, 8 and 9 are diagrammatic views of the different positions of the rotor in the cylinder;

Figure 10 is a partial section similar to Figure 4 with the parts in different position;

Figure 11 is a section on the line 11—11 of Figure 4;

Figure 12 is an end of a detail, and

Figure 1:
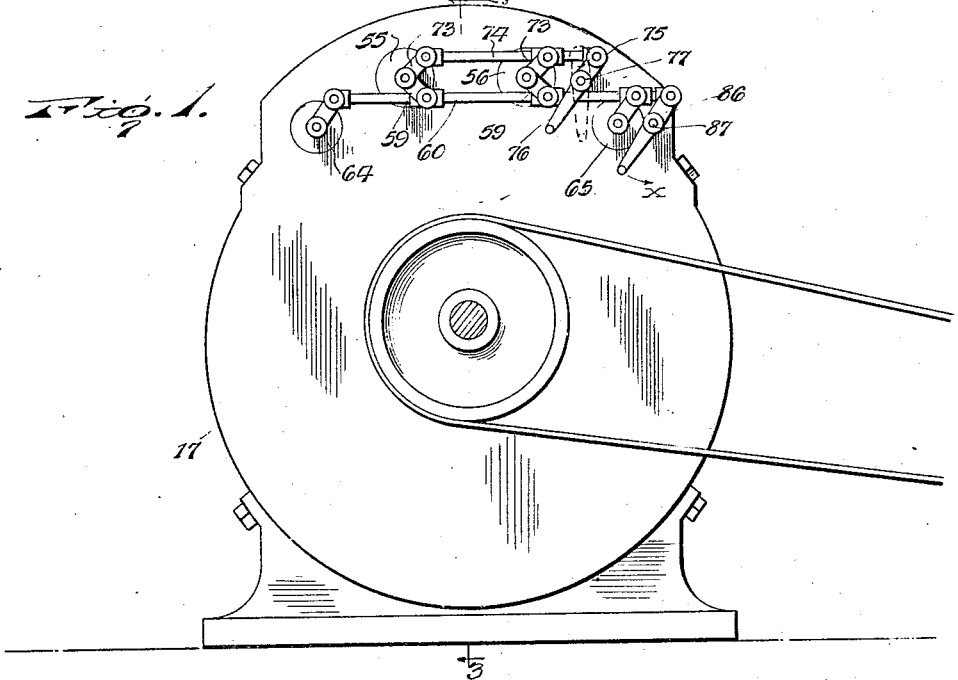
Figure 1 represents a side elevation of the rotary engine.
Figure 2:
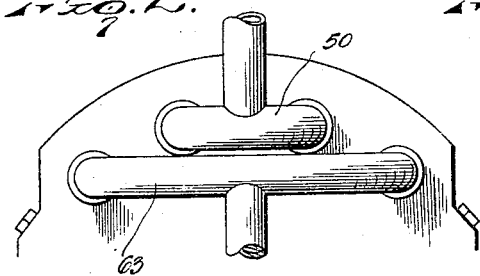
Figure 2 is a partial side elevation seen from the opposite side of Figure 1.
Figure 5:
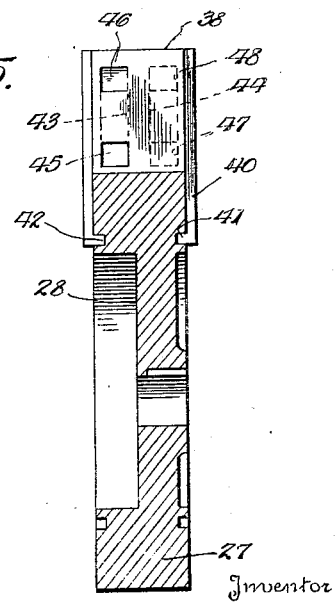
Figure 5 is a vertical section of the rotor and the abutment member.
Figure 13:
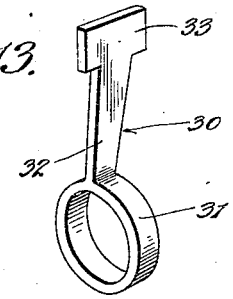
Figure 13 is a perspective view of another detail.

In the drawings, the reference numeral 15 represents a base or foundation plate provided with one, two or more seats 16 for the casing 17. This casing is substantially of cylindrical shape having a chamber 18 lined with a cylindrical bushing 19. This casing preferably has one of its flat ends detachable for exposing the interior of the casing. A hub 20 is concentrically positioned on one side of the casing and provided with an eccentric bore 21 for the main shaft 22. A packing box 23 with packing 24 and a tightening nut 25 is provided in continuation of the bore 21 in order to provide a tight joint around the shaft 22 and a similar box packing and nut 22, 23, 24 and 25, respectively, are also provided in the opposite end of the casing, as seen to the right in Figure 3.

The shaft 22 is rigidly secured by means of a key or other similar device 26 to a rotor 27 of cylindrical shape. This rotor is eccentrically mounted on the shaft in such a manner that one point of the periphery of the rotor momentarily contacts with the inner periphery of the bushing 19 once during each revolution of the rotor. The rotor is recessed on one side, as at 28, to a depth substantially the same or slightly more than the length of the hub 20 and on this hub is mounted a piston 30 with its annular bearing portion 31. The piston is provided with a thin shank 32 terminating with a blade 33 of the same width as the rotor both corresponding to the length of the cylindrical bushing 19 so as to completely fill the chamber in its axial direction. In order to accommodate the piston, the rotor has a radial recess 34 terminating with a V-shaped slot 35 having semi-circular bearing pieces 36 permitting a slight oscillation of the shank 32 with regard to the rotor during the revolution of the latter. It will now be understood that as the piston has a permanent engagement with the rotor, it must partake in the revolution of the latter, but as the piston is concentrically mounted in the chamber formed in the bushing 19, the blade 33 will always contact with the inner face of the bushing.

As seen in Figures 1, 2, 3 and 4, the upper part of the casing has an extension 37 in which is slidably mounted a rectangularly shaped abutment member 38 in a recess 39 provided therefor. This abutment member has two depending fingers 40 terminating with the claws 41 engaging in annular grooves 42 provided in the rotor 27. These grooves are concentrically positioned as regards the outer periphery of the rotor, and the abutment member 38 is consequently positioned at a constant distance from the outer periphery of the rotor during the revolution of the latter. As, however, the periphery of the rotor retracts and advances with relation to the recess 39 in which the abutment member is housed, the latter will receive a radially reciprocating movement in the casing 17.

The abutment member 38 is provided with two passages 43 and 44 running in longitudinal direction thereof, one of these passages 43 having orifices 45 and 46 opening to one side of the abutment member, while the other passage 44 has similar orifices 47 and 48 facing in the opposite direction of the abutment member. The upper ones of these orifices 46 and 48 are so located that they always remain within the recess 39 during the reciprocation of the abutment member, while the lower orifices 45 and 47 open into the casing chamber when the abutment member is lowered into the same.

At 49 in Figure 4 is shown a port communicating with an intake manifold 50, the latter also communicating with a similar port 51 on the other side of the abutment member 38. These ports have side openings 52 and 53 respectively adapted to register with the orifices 46 and 48 respectively when the abutment member 38 stands in its lower position. These ports have each a cylindrical valve 55, 56 adapted to revolve in the ports and are furnished with side openings of the same extent as the openings 52, 53 in their respective ports. As best seen in Figures 11 and 1, the valves consist of hollow cylinders having a closed end 58 to which is rigidly attached an arm 59 connecting with a rod 60 which rod being connected to both of the valves 55 and 56 governs the position of the respective valve openings in such a manner that, when the side opening 52 registers with the orifices 46 on one side, the side opening 53 of the other valve 51 is turned away from the corresponding orifice 48 on the other side of the abutment 38; in this manner opening one and closing the other.

At 61 in the upward extension 37 of the casing, see Figure 4, is provided an exhaust port adapted to co-operate with the port 51 on the other side of the abutment member 38 and a similar exhaust port 62 is symmetrically arranged in the extension 37 of the casing adapted to co-operate with the intake port 49. These two exhaust ports 61 and 62 open into an exhaust manifold 63 and have cylindrical valves 64 and 65 respectively with side openings 66 and 67 adapted to register with the apertures 68 and 69 provided in the bushing 19. As best seen in Figure 1, these exhaust valves 64 and 65 are linked to the rod 60 in a similar manner as already described with regard to the intake valves 55 and 56 and at one end of the rod 60 is linked an operating lever 86 fulcrumed at 87 for reciprocating the rod 60 and in this manner rotate the valves 55 and 56, 64 and 65 simultaneously. This operating lever 66 accordingly constitutes a starting and reversing lever for the engine. With the lever 86 positioned, as shown in Figure 1, the valves 55 and 65 will then communicate with the cylinder chamber, as seen in Figure 4, while the valves 51 and 61 remain closed, the opposite taking place when the operating lever 86 is thrown in the direction of the arrow X in Figure 1.

Referring again to Figure 11, the intake valves are provided with a central spindle 70 having a pair of wings 71, see Figure 12, at its inner end, which wings are sector shaped and adapted to cover the end openings 72 in the inner end of the valves 55 and 56 when turned in one direction and to uncover these openings when turned in the opposite direction. On the piston 70 is provided a link 73 which is hinged to a sliding rod 74. At the end of the sliding rod 74 is pivoted, as at 75, the control lever 76 fulcrumed at 77. As both the intake valves 55 and 56 have similar connection with the sliding rod 74, both are controlled by the lever 76 so that with the ports in the position seen in Figure 1, the openings 72 in the intake valves are fully opened and with the lever 76 in the dotted position of this lever, the openings will be closed. Between these two positions, the degree of opening may be adjusted and consequently the supply of steam or fuel may be regulated.

Referring now to Figures 6, 7, 8 and 9, the cycle operation of the engine will be readily understood. In Figure 6, the rotor contacts with the inner surface of the bushing and consequently the chamber is open all around the rotor. In Figure 7, the rotor turning in the direction of the arrow Y has made a quarter turn and it now stands free from the entire inner periphery of the bushing. As, however, the piston constantly follows the inner periphery of the bushing, the chamber is divided into two compartments, one of the extent of a quarter turn on the upper right hand side of the figure and the other of the extent of three-fourths turn of the remaining part of the circumference. In this position, the abutment member 38 has descended slightly and is just beginning to open into the chamber between the abutment member and the piston so that the steam is beginning to enter in that quarter of the chamber.

In the position of the parts shown in

Figure 8, same as in Figure 4, the chamber is divided into two equal compartments in the shape of annular rings of uniform thickness and the abutment member 38 has now reached its full downward travel so that the passage of the steam is fully opened into the right hand compartment of the chamber, as seen in this figure. It will now be understood that the right hand half of the compartment contains live steam while exhaust steam is contained in the left compartment of the chamber and ready to be exhausted through the exhaust port 62 which stands open.

With the parts in the position seen in Figure 9, the live steam which still enters the chamber, the inlet passage being slightly open, fills three quarters of the chamber in the right hand and lower left hand part thereof, while the remaining quarter compartment is still exhausting steam through the exhaust port. During the next portion of a quarter turn, the intake port will be entirely closed and the steam behind the piston 30 will then be ready to be exhausted as soon as the piston has passed the exhaust port 69, whereupon the cycle is repeated.

With the operating lever 66 turned in the opposite direction, the ports 49 and 62 will be closed and the ports 51 and 61 will be opened and the engine will in this manner be reversed.

By arranging the rotors in different angular positions along the shaft 22, it will be evident that a dead center will be entirely eliminated and a perfectly smooth working will be attained. As the main shaft 22 is perfectly straight, the removal of the same will be easily accomplished as it can be drawn out simultaneously straight through all the casings.

No governor has been shown in the drawings and it should be understood that any good type of governor can be used, this forming no part of the invention.

Having thus described the invention, what is claimed as new is:

1. A rotary engine having a casing with a cylindrical chamber, a main shaft eccentrically mounted in said casing, a cylindrical rotor eccentrically secured on said shaft, a piston concentrically mounted in the chamber and adapted to be revolved therein through engagement with said rotor, an abutment member slidably mounted in said casing and provided with an inlet aperture opening on one side of said member, and means connecting said member and said rotor for reciprocation of said member, said means including fingers on said member straddling said rotor and claws on said fingers engaging in grooves provided on said rotor and concentric therewith.

2. A rotary engine having a casing with a cylindrical chamber, a main shaft eccentrically mounted in said casing, a clyindrical rotor eccentrically secured on said shaft, a piston concentrically mounted in the chamber and adapted to be revolved therein through engagement with said rotor, an abutment member slidably mounted in said casing and provided with a longitudinally directed passage terminating at each end with an intake orifice both opening on one side of said member, and means connecting said member and said rotor for reciprocation of said member, an outlet port in said casing, an inlet port in the casing adapted to register with the outer one of said intake orifices when the inner one of the orifices opens into said chamber and the outlet port communicating directly with the chamber on the opposite side of said intake orifices.

3. A rotary engine having a casing with a cylindrical chamber, a main shaft eccentrically mounted in said casing, a cylindrical rotor eccentrically secured on said shaft, a piston concentrically mounted in the chamber and adapted to be revolved therein through engagement with said rotor, an abutment member slidably mounted in said casing and provided with a longitudinally directed passage terminating at each end with an intake orifice both opening on one side of said member, means connecting said member and said rotor for reciprocation of said member, said means including fingers on said member straddling the rotor and claws on said fingers engaging in annular grooves provided on the rotor concentric therewith, an outlet port in said casing, an inlet port in the casing adapted to register with the outer one of said intake orifices when the inner one of the orifices opens into said chamber, the outlet port communicating directly with the chamber on the opposite side of said intake orifices, and means for simultaneously opening or closing said ports.

In testimony whereof I affix my signature.

DAN M. KINTNER. [L. S.]